(No Model.)
W. C. KRICK.
HANDLE FOR FLOWER POTS OR DISHES.
No. 578,152.        Patented Mar. 2, 1897.
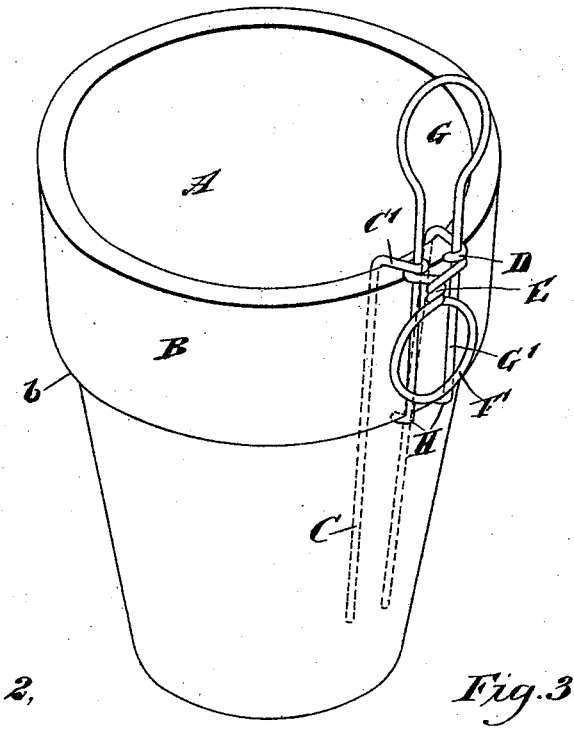
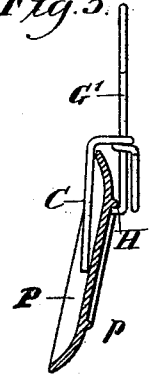
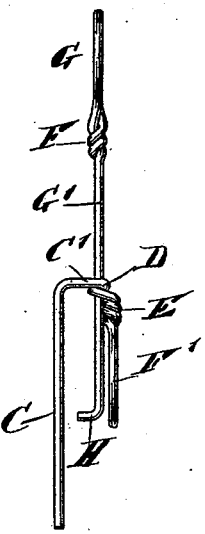
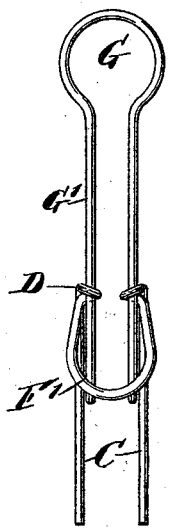
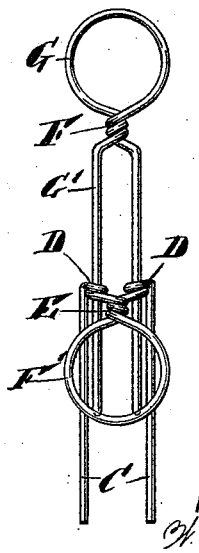
WITNESSES:
Edward Thorpe
H. L. Reynolds.
INVENTOR
W. C. Krick.
BY 
ATTORNEYS.

UNITED STATES PATENT OFFICE.

WILLIAM C. KRICK, OF BROOKLYN, NEW YORK.

HANDLE FOR FLOWER-POTS OR DISHES.

SPECIFICATION forming part of Letters Patent No. 578,152, dated March 2, 1897.

Application filed October 21, 1896. Serial No. 609,493. (No model.)

*To all whom it may concern:*

Be it known that I, WILLIAM C. KRICK, of Brooklyn, in the county of Kings and State of New York, have invented a new and Improved Handle for Flower-Pots or Dishes, of which the following is a full, clear, and exact description.

My invention relates to improvements in handles for flower-pots, saucers, plates, or similar articles, which handles are made of wire in such a manner that they may be manufactured at very small cost and are readily attached to the above-named articles for convenience in handling the same.

Reference is to be had to the accompanying drawings, forming a part of this specification, in which similar characters of reference indicate corresponding parts in all the figures.

Figure 1 is a perspective view of a flower-pot with the device attached thereto. Figs. 2 and 3 are side and front elevations of a slightly-modified form of the device. Fig. 4 is a front elevation of a further-modified construction; and Fig. 5 shows the adaptability of my device for use as a handle for saucers, plates, and similar articles.

The object of my invention is to provide a device which shall be cheap to manufacture and may be applied to flower-pots or form a handle by which the same may be readily handled in greenhouses and other places, and which is also capable of application to saucers, plates, and similar articles.

A further object is to make the device adjustable, so that it may fit flower-pots of different sizes.

I will first describe the device in its particular application as a handle for flower-pots.

The device consists of two parts—first, a staple having the free ends C of the body straight and adapted to be inserted upon the inside of the flower-pot, being pushed down through the soil along the inner surface of the pot. At the top of the pot the two sides are bent outwardly over the upper edge of the pot, forming bends C'. The wire at this point just outside the upper edge of the pot has an eye D formed therein adapted to receive the shanks of the lifting-staple or handle. In the form shown in Fig. 1 the two side wires are twisted together below the eyes D, as shown at E, and then formed into a loop or ring F', the same being bent down parallel with the shanks C. The other staple, forming the handle or loop by which the device is grasped when in use, has an open ring G formed at its upper end. The parallel portions G' of the latter staple are passed through the eyes D in the other staple and have two short bends H extending inwardly and adapted to pass under the ledge usually formed upon the upper portion of the flower-pot. The loop F' of the first staple is bent down so that it comes close against the rear surface of the shanks G' of the handle and materially stiffens the same and prevents its being pulled out so as to disengage the bent ends H from the ledge of the pot.

The form shown in Figs. 2 and 3 differs from that just described only in having the upper portion of the handle twisted together, as shown at F, and then having the loop or ring G formed at the upper end thereof.

In the form shown in Fig. 4 neither of the staples has this twist. The lower staple, after forming the eyes D, is simply bent downward, so as to form a loop F' for the lower portions of the shanks G'.

In using the device the inner staple has its shanks C forced into the soil next to the inner surface of the pot. The upper staple, having the handle thereon, is pressed downward over the outside of the pot, so that the bends H will engage the under surface of the ledge. The same handle may be applied to pots and dishes having considerable difference in the width of this ledge, the upper staple for this purpose sliding in the eyes D.

In Fig. 5 the application of my device as a handle for saucers, plates, &c., is shown. The device is exactly the same for this use as that described above for use with flower-pots. The shanks of the staple C are placed on the inner or upper side of the saucer or plate P and the hooks or bends H of the staple G' placed behind the circular ring or ridge *p* on the bottom of the saucer. The application of the handle to this use will be readily seen.

Having thus described my invention, I claim as new and desire to secure by Letters Patent—

1. A holder or handle for flower-pots, plates and similar articles consisting of a wire bent so that the ends form two shanks extending in the same direction, the two parts of the wire at the inner ends of the shank portions being bent to one side and in the same direction, and having eyes formed therein whose axes extend in the same direction as the shanks, in combination with a handle consisting of a wire bent in the form of a staple or double-pointed pin, each side thereof passing through one of the eyes in the other piece and having at its outer end a short bend in the direction of the shanks of the other piece, substantially as described.

2. A holder or handle for flower-pots, plates and similar articles consisting of a wire bent so that the ends form two shanks extending in the same direction, the two parts of the wire at the inner ends of the shank portions being bent to one side and in the same direction, and having eyes formed therein whose axes extend in the same direction as the shanks, and having its loop, or connecting portion, bent back upon itself parallel with the shanks with the loop toward the points of the shanks, in combination with a handle consisting of a wire bent in the form of a staple or double-pointed pin, each side thereof passing through one of the eyes in the other piece and between the loop end and shank thereof, and having at its outer end a short bend in the direction of the shanks of the other piece, substantially as described.

WILLIAM C. KRICK.

Witnesses:
H. L. REYNOLDS,
JAMES M. HENLEY.